United States Patent [19]

Iwasaki

[11] Patent Number: 5,935,181
[45] Date of Patent: Aug. 10, 1999

[54] AUTOMOTIVE VEHICLE SUSPENSION CONTROL SYSTEM

[75] Inventor: Katsuya Iwasaki, Atsugi, Japan

[73] Assignee: Unisia Jecs Corporation, Atsugi, Japan

[21] Appl. No.: 08/674,165

[22] Filed: Jul. 1, 1996

[30] Foreign Application Priority Data

Jul. 4, 1995 [JP] Japan .................................. 7-168943

[51] Int. Cl.⁶ .................................................. G06G 7/76
[52] U.S. Cl. .............................. 701/37; 701/36; 701/38; 180/197; 280/5.515; 280/6.159
[58] Field of Search .................. 701/36, 37, 38, 701/48, 70; 280/707, 840, 703, 708, 702, 5.51, 5.515, 5.512, 5.507, 6.159; 180/41, 312, 902

[56] References Cited

U.S. PATENT DOCUMENTS

| | | | |
|---|---|---|---|
| 4,696,489 | 9/1987 | Fujishiro et al. | 280/707 |
| 4,888,696 | 12/1989 | Akatsu et al. | 701/37 |
| 5,085,458 | 2/1992 | Kii et al. | 280/707 |
| 5,096,219 | 3/1992 | Hanson et al. | 280/707 |
| 5,154,442 | 10/1992 | Milliken | 280/702 |
| 5,200,896 | 4/1993 | Sato et al. | 364/426.01 |
| 5,208,749 | 5/1993 | Adachi et al. | 701/38 |
| 5,322,320 | 6/1994 | Sahashi et al. | 701/37 |
| 5,365,432 | 11/1994 | Kakizaki et al. | 701/37 |
| 5,377,107 | 12/1994 | Shimizu et al. | 701/37 |
| 5,398,184 | 3/1995 | Yamaoka et al. | 701/37 |
| 5,430,646 | 7/1995 | Kimura et al. | 701/37 |
| 5,440,488 | 8/1995 | Yamaoka et al. | 701/37 |
| 5,467,280 | 11/1995 | Kimura | 701/37 |
| 5,485,377 | 1/1996 | Sasaki et al. | 701/37 |
| 5,488,556 | 1/1996 | Sasaki | 701/37 |
| 5,490,068 | 2/1996 | Shimizu et al. | 701/38 |
| 5,510,985 | 4/1996 | Yamaoka et al. | 701/37 |
| 5,526,262 | 6/1996 | Kimura et al. | 701/38 |
| 5,572,426 | 11/1996 | Sasaki et al. | 701/37 |
| 5,638,275 | 6/1997 | Sasaki et al. | 701/38 |
| 5,642,899 | 7/1997 | Inoue et al. | 701/37 |
| 5,691,899 | 11/1997 | Terasaki | 701/38 |
| 5,701,246 | 12/1997 | Uchiyama | 701/38 |
| 5,706,196 | 1/1998 | Romstadt | 701/38 |

FOREIGN PATENT DOCUMENTS

| | | |
|---|---|---|
| 0 412 530 | 2/1991 | European Pat. Off. . |
| 0 616 912 | 9/1994 | European Pat. Off. . |
| 2 231 848 | 11/1990 | United Kingdom . |
| 2 261 491 | 5/1993 | United Kingdom . |

OTHER PUBLICATIONS

Patent Abstracts of Japan, vol. 10, No. 368 (M–543), 9 Dec. 1986 & JP 61 163011 A (Nissan), 23 Jul. 1986.

Primary Examiner—Jacques H. Louis-Jacques
Attorney, Agent, or Firm—Foley & Lardner

[57] ABSTRACT

A suspension control system for use with shock absorbers provided between sprung and unsprung masses of an automotive vehicle at the positions of the respective vehicle road wheels for providing variable damping force characteristics. The suspension control system includes sensors mounted on the vehicle for sensing sprung mass vertical accelerations acting in a predetermined direction with respect to the vehicle at the respective road wheel positions. A component of the vehicle longitudinal acceleration acting in the predetermined direction is calculated as a function of vehicle pitching angle and vehicle longitudinal acceleration. The sensed sprung mass vertical accelerations are corrected in a direction to cancel the calculated vehicle longitudinal acceleration component. The shock absorbers are controlled based on the respective corrected sprung mass vertical accelerations.

5 Claims, 16 Drawing Sheets

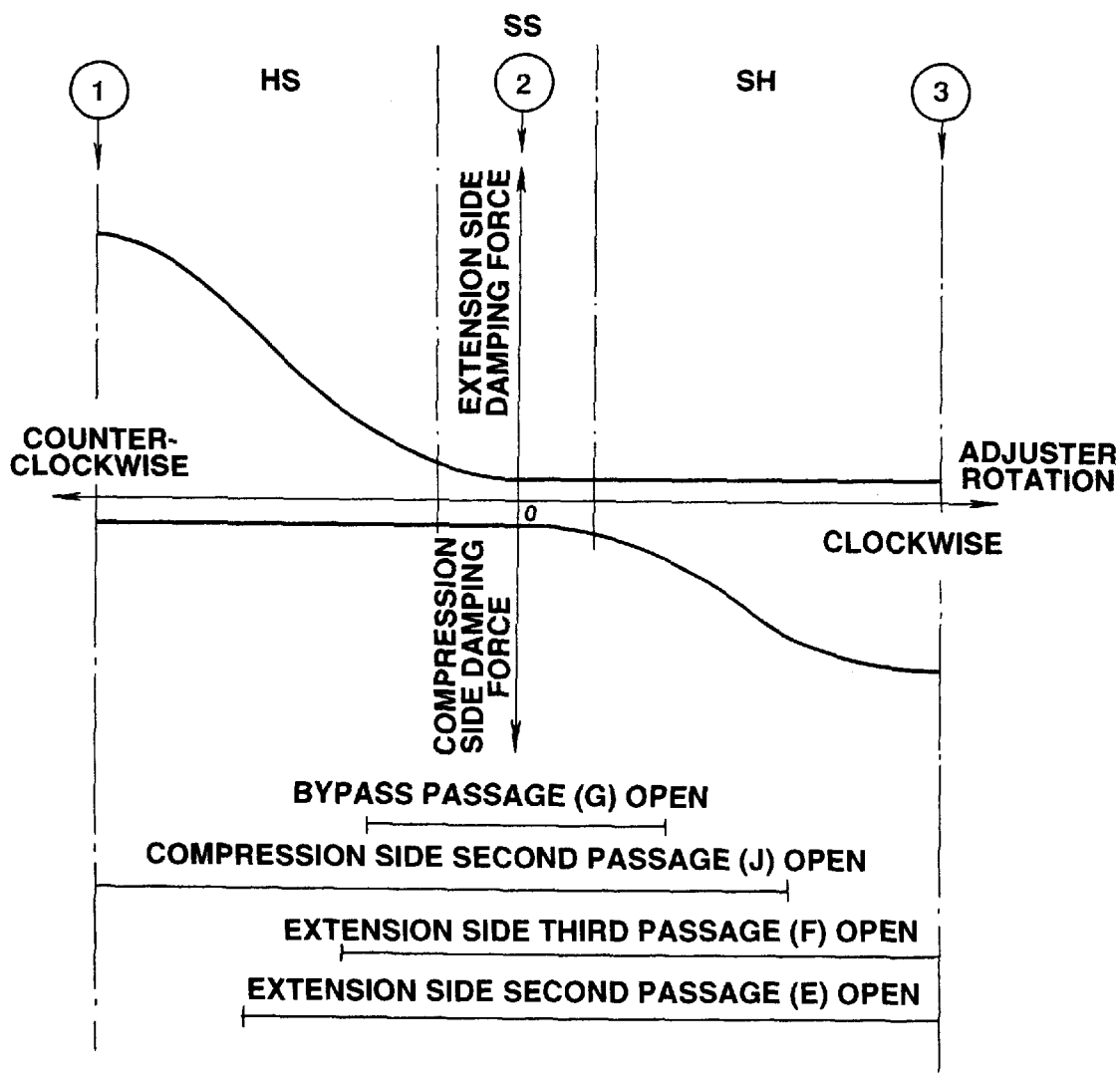

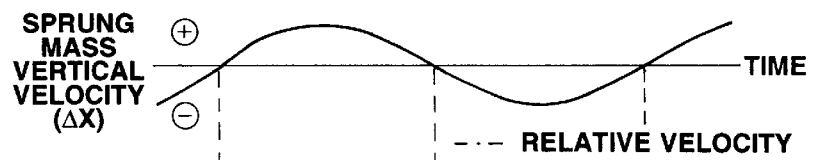
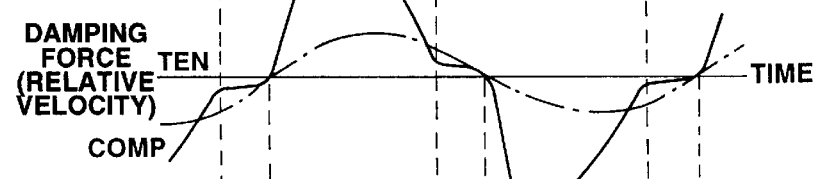
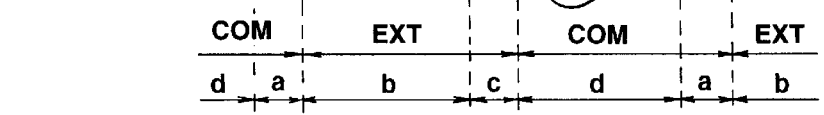
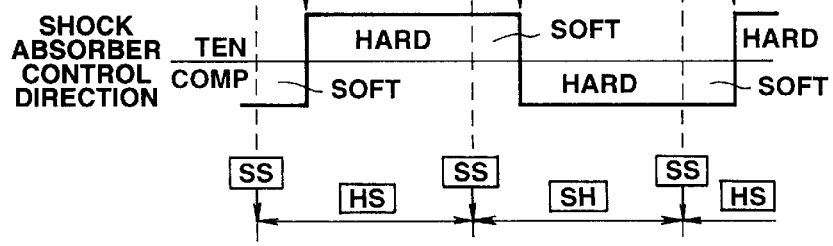
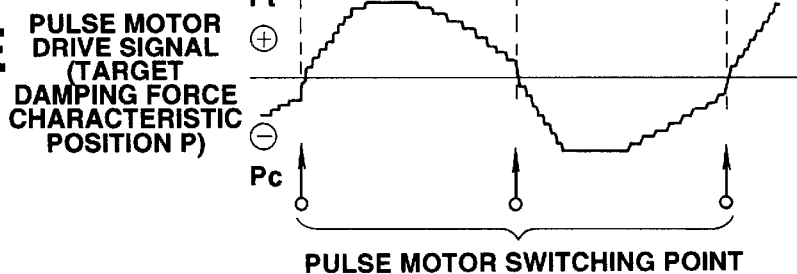

AUTOMOTIVE VEHICLE SUSPENSION CONTROL SYSTEM

BACKGROUND OF THE INVENTION

This invention relates to a suspension control system for use with an automotive vehicle supported on front and rear pairs of road wheels to control the damping force characteristic of each of the shock absorbers interposed between a sprung mass (vehicle body) and an unsprung mass (corresponding one of the road wheels).

For example, Japanese Patent Kokai No. 61-163011 discloses an automotive vehicle suspension control system for controlling the damping force characteristics of the shock absorbers provided on an automotive vehicle. The conventional suspension control system is arranged to suppress vibrations on the vehicle body by controlling the shock absorber damping force characteristics toward the hard side when both of the sprung mass vertical velocity and the relative velocity between the sprung and unsprung masses have the same sign and to suppress the unsprung mass input to be transmitted to the sprung mass by controlling the shock absorber damping force characteristics toward the soft side when the sprung mass vertical velocity and the relative velocity between the sprung and unsprung masses have different signs. The sprung mass vertical velocity is calculated based on the sprung mass vertical acceleration sensed with the use of a vertical acceleration sensor mounted on the sprung mass (vehicle body). Since the vertical acceleration sensor is fixed to detect the sprung mass vertical acceleration in a detection perpendicular to the road surface, however, the vertical acceleration indicative signal produced from the vertical acceleration sensor will includes a vehicle longitudinal acceleration component superimposed thereon to drift the vertical acceleration indicative signal when the vehicle is inclined into a scutting or diving position. This sensor signal drift causes introduction of errors into the shock absorber damping force characteristic control to degrade the vehicle driving stability.

SUMMARY OF THE INVENTION

It is a main object of the invention to provide an improved automotive vehicle suspension control system which is free from errors introduced into the shock absorber damping force characteristic control when the vehicle is inclined into scutting or diving position so as to ensure good vehicle driving stability.

There is provided, in accordance with the invention, a suspension control system for use with an automotive vehicle supported on front-left and -right road wheels at front-left and -right road wheel positions and also on rear-left and -right road wheels at rear-left and -right road wheel positions. The suspension control system comprises shock absorbers provided between sprung and unsprung masses of the vehicle at the respective road wheel positions for providing variable damping force characteristics, means mounted on the vehicle for sensing sprung mass vertical accelerations acting in a predetermined direction with respect to the vehicle at the respective road wheel positions, means for determining a vehicle longitudinal acceleration, means for calculating a vehicle pitching angle based on the sensed vehicle longitudinal acceleration, means for calculating a component of the vehicle longitudinal acceleration acting in the predetermined direction based on the calculated vehicle pitching angle and the sensed vehicle longitudinal acceleration, means for correcting the sensed sprung mass vertical accelerations to cancel the calculated vehicle longitudinal acceleration component, and means for controlling the shock absorbers based on the respective corrected sprung mass vertical accelerations.

BRIEF DESCRIPTION OF THE DRAWINGS

The invention will be described in greater detail by reference to the following description taken in connection with the accompanying drawings, in which:

FIG. 6 is a diagram used in explaining the control ranges in which the shock absorber is operable with rotation of the adjuster placed in the shock absorber;

FIGS. 22A to 22E are graphs used in explaining the damping force characteristic control.

DETAILED DESCRIPTION OF THE INVENTION

Figure 1:
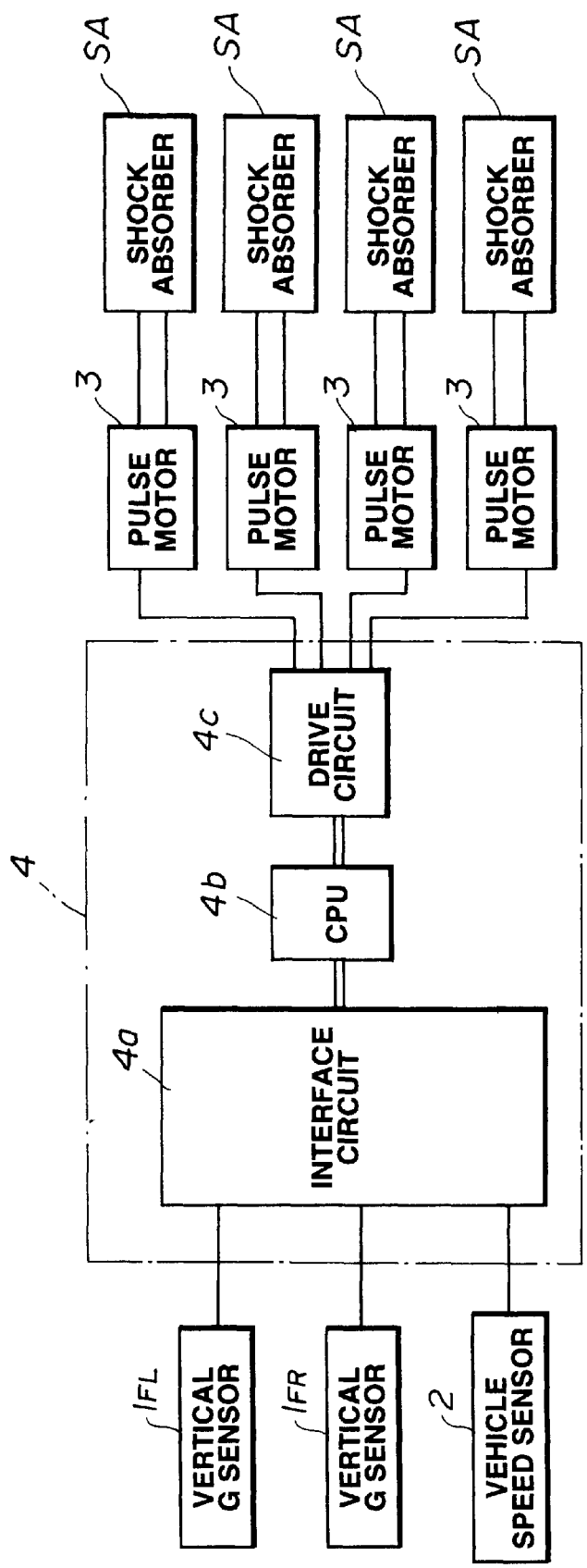
FIG. 1 is a schematic diagram showing one embodiment of an automotive vehicle suspension control system made in accordance with the invention.
Figure 2:
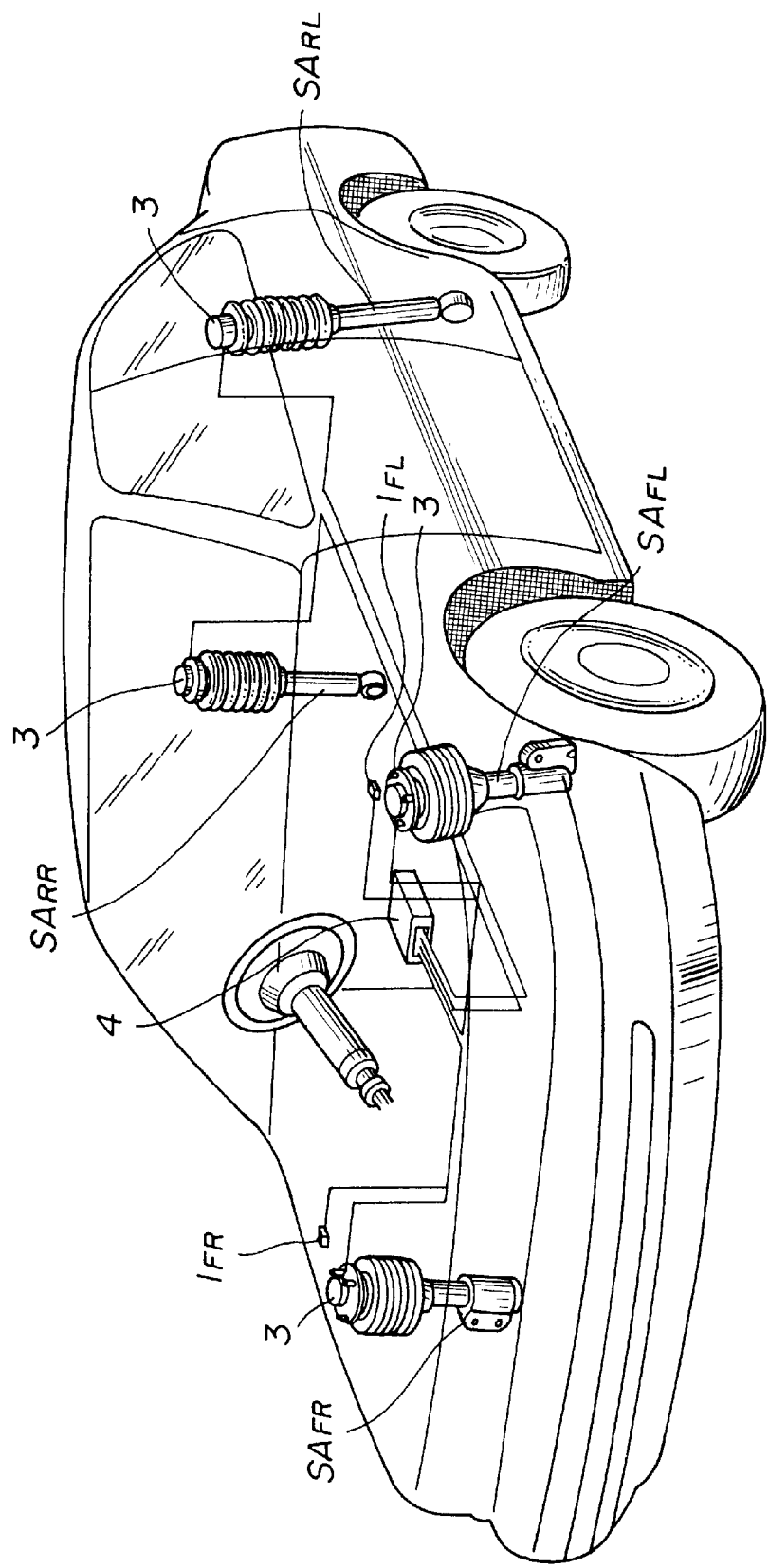
FIG. 2 is a perspective view showing shock absorbers used with the automotive vehicle.

With reference to the drawings, and in particular to FIG. 1, there is shown a schematic diagram of an automotive vehicle suspension control system embodying the invention. The suspension control system is shown as including a control unit 4 for driving pulse motors 3 in a manner to provide optimum damping force characteristics for shock absorbers SA. As best shown in FIG. 2, each of the four shock absorbers $SA_{FL}$, $SA_{FR}$, $SA_{RL}$ and $SA_{RR}$ is interposed between a sprung mass (vehicle body) and an unsprung mass (tire wheel). The control unit 4, which is mounted near the driver's seat (FIG. 2), includes an interface circuit 4a, a central processing unit (CPU) 4b, and a drive circuit 4c. The central processing unit 4b calculates desired damping force characteristics (in the form of damping coefficients) to be provided for the respective shock absorbers SA. These calculations are made based on signals fed thereto through the interface circuit 4a from various sensors including sprung mass vertical G sensors $1_{FL}$ and $1_{FR}$, and a vehicle speed sensor 2. The vertical G sensors. $1_{FL}$ and $1_{FR}$ are mounted on the vehicle body (sprung mass) near the positions (referred hereinafter as wheel positions) at which the respective shock absorbers $Sa_{FL}$ and $Sa_{FR}$ are attached to the vehicle body, as shown in FIG. 2. The vertical G sensors $1_{FL}$ and $1_{FR}$ sense the vertical accelerations G of the vehicle body (sprung mass) at the respective wheel positions and produce sensor signals indicative of the sensed vertical accelerations $G_{FL}$ and $G_{FR}$ to the interface circuit 4a. The vertical acceleration sensor signal has a positive sign when the sensed acceleration is directed upward and a negative sign when the sensed acceleration is directed downward. The vehicle speed sensor 2 senses the speed Vs of running of the vehicle and it produces a sensor signal indicative of the sensed vehicle speed Vs to the interface circuit 4a. The central processing unit 4b transfers the control word specifying the calculated damping coefficient to the drive circuit 4c for driving a corresponding one of the step motors 3 to provide the calculated damping force characteristic.

Figure 3:
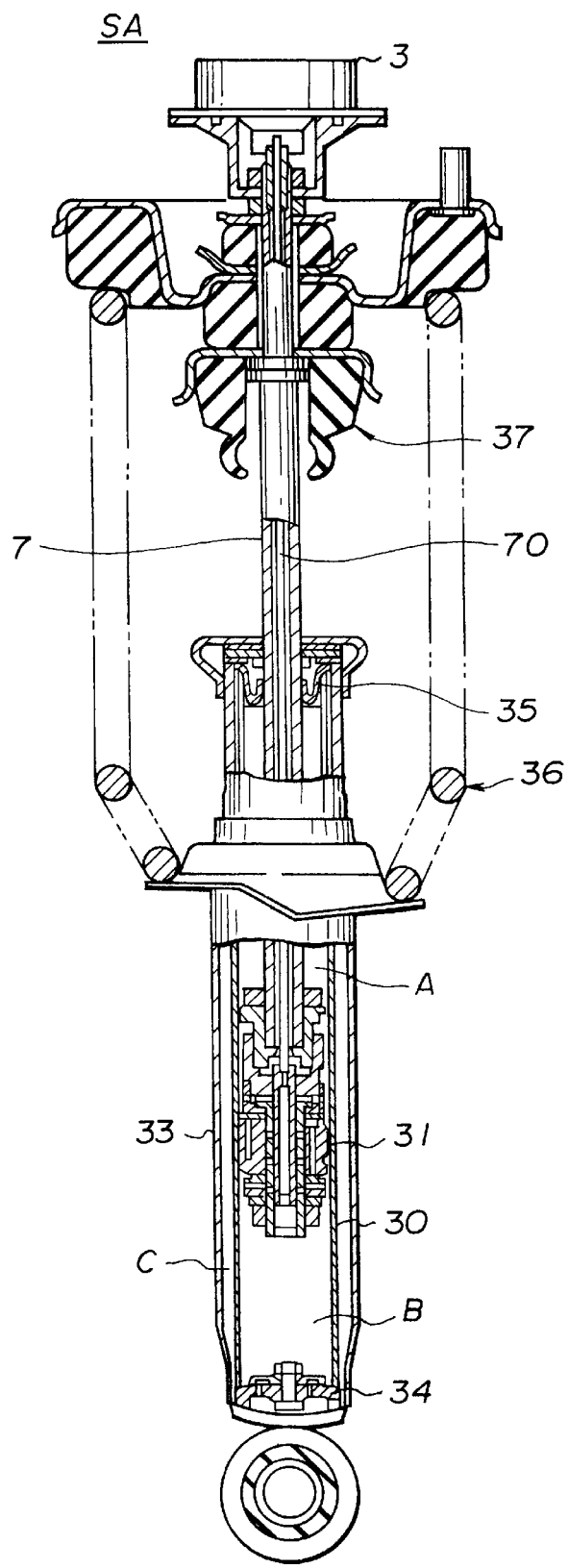
FIG. 3 is a sectional view showing the detailed structure of each of the shock absorbers.

Referring to FIG. 3, there is shown a variable damping force type shock absorber which may be used with the suspension control system. The shock absorber SA includes a cylinder 30 and a piston 31 mounted for reciprocal motion within the cylinder 30. The piston 31 defines upper and lower chambers A and B on the opposite sides thereof. An outer envelope 33 is placed to surround the cylinder 30 so as to define a reservoir C along therewith. A base 34 is provided to separate the reservoir C from the lower chamber B. A piston rod 7 is coupled to the piston 31 for sliding movement. The sliding movement of the piston rod 7 is guided by a guide member 35. A suspension spring 36 is seated between the outer envelope 33 and the vehicle body. The numeral 37 designates a bumper rubber member (or bushing).

Figure 4:
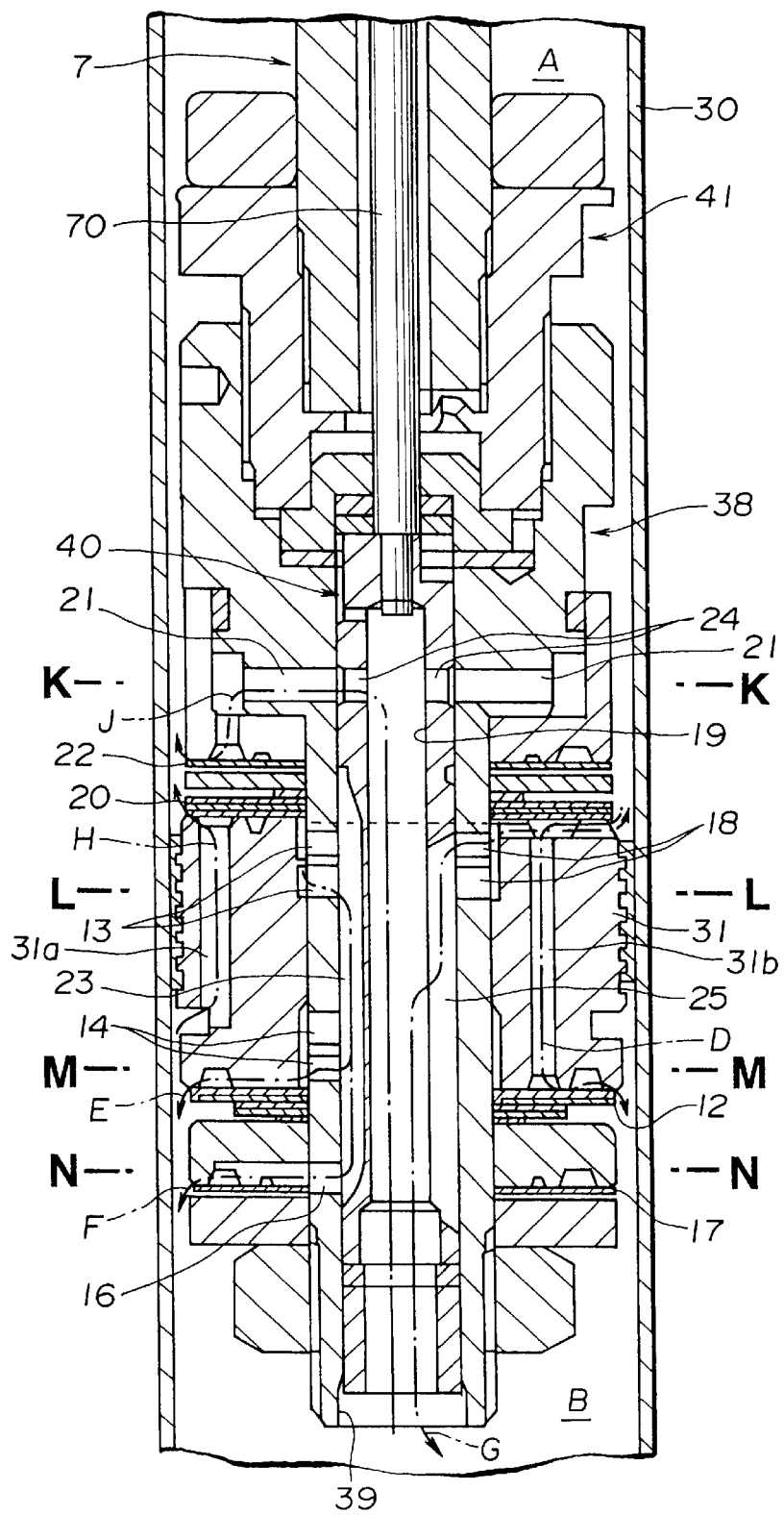
FIG. 4 is a fragmentary enlarged sectional view showing the significant portion of the shock absorber.

Referring to FIG. 4, the piston 31 has first and second passages 31a and 31b extending over the full length of the piston 31. A compression side damping valve 20 is provided in cooperation with the first passage 31a. An extension side damping valve 12 is provided in cooperation with the second passage 31b. the piston rod 7 is threadedly engaged at its tip end with a bound stopper 41. The bound stopper 41 is threadedly engaged within a stud 38 extending through the piston 31. The stud 38 is formed with a flow passage 39 bypassing the first and second passages 31a and 31b to form a passage (passages E, F, G and J) connected between the upper and lower chambers A and B. Provided in cooperation of the flow passage 39 are an adjuster 40, an extension side check valve 17 and a compression side check valve 22. The adjuster 40 is drivingly associated with the corresponding one of the pulse motors 3 which rotates the adjuster through a control rod 70 (FIG. 3) to adjust the effective area of the flow passage 39. The stud 38 is formed with first, second, third, fourth and fifth ports 21, 12, 18, 14 and 16 in a descending scale. The adjuster 40 has a hollow portion 19, first and second lateral holes 24 and 25, and a longitudinal groove 23 formed in its outer peripheral surface. In this structure, thus, four flow passages are formed for connection between the upper and lower chambers A and B during extension stroke (or phase). These flow passages include an extension side first flow passage D extending from the second passage 31b through the inner side of the extension side damping valve 12 to the lower chamber B, an extension side second flow passage E extending from the second port 13 through the longitudinal groove 23 to the fourth port 14 and hence through the outer peripheral side of the extension side damping valve 12 to the lower chamber B, an extension side third flow passage F extending from the second port through the longitudinal groove 23 to the fifth port 16 and hence through the extension side check valve 17 to the lower chamber B, and a bypass passage G extending from the third port 18 through the second lateral hole 25 and the hollow portion 19 to the lower chamber B. Furthermore, three flow passages are formed for connection between the upper and lower chambers A and B during compression stroke. These flow passages include a compression side first flow passage H extending from the first passage 31a through the compression side damping valve 20, a compression side second flow passage J extending from the hollow portion 19 through the first lateral hole 24 to the first port 21 and hence through the compression side check valve 22 to the upper chamber A, and a bypass passage G extending from the hollow portion 19 through the second lateral hole 25 and the third port 18 to the upper chamber A.

Figure 5:
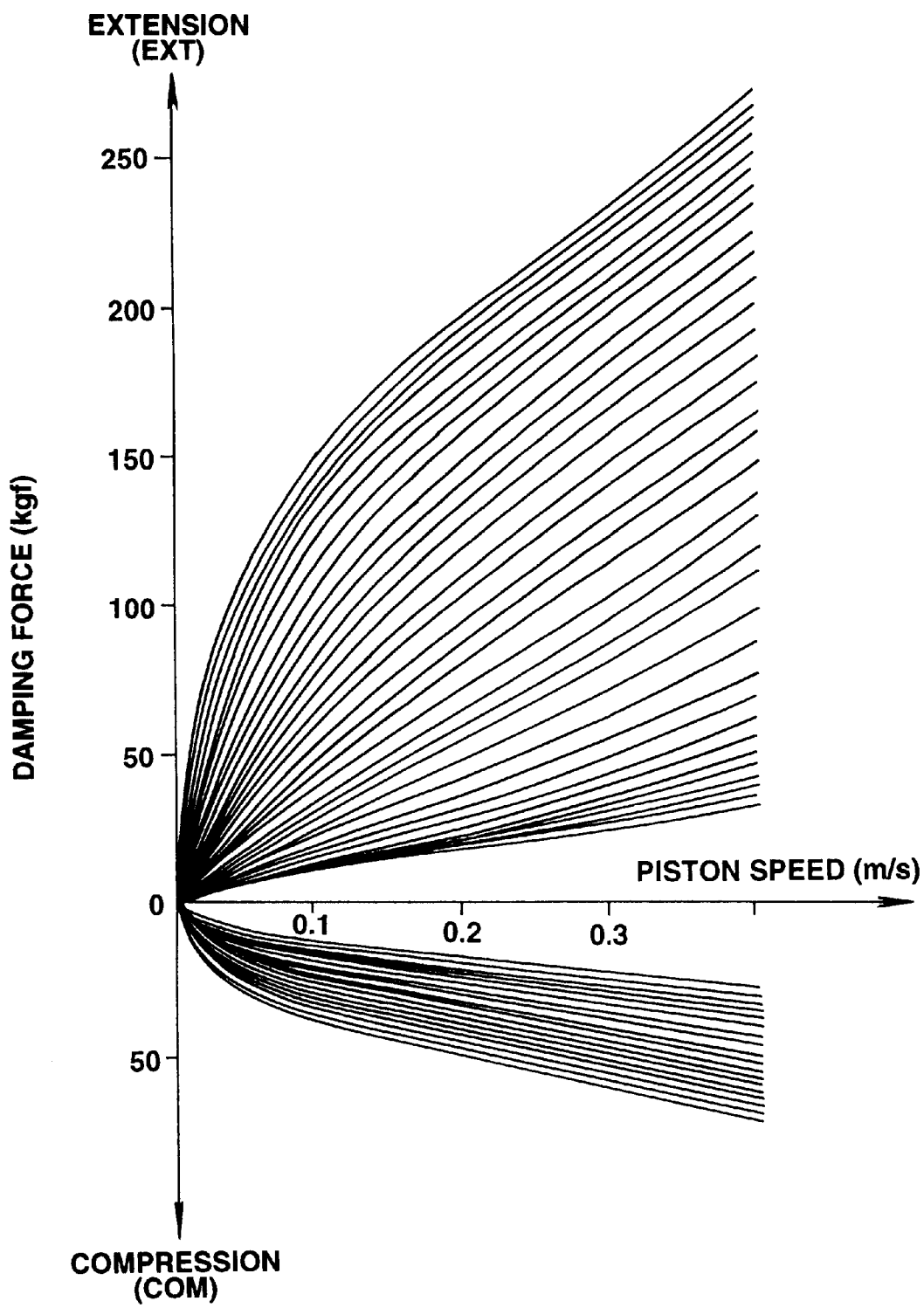
FIG. 5 is a graph of damping force versus piston speed.
Figure 7A:
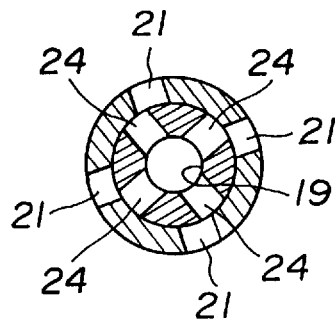
FIG. 7A is a cross-sectional view taken along the line K—K of FIG. 4 in the first position of the adjuster.
Figure 7B:
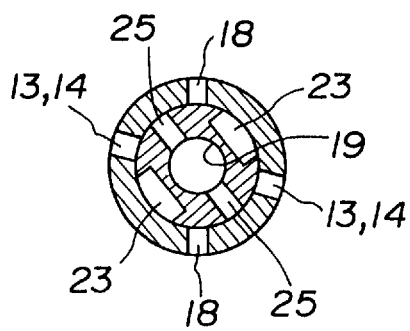
FIG. 7B is a cross-sectional view taken along the lines L—L and M—M of FIG. 4 in the first position of the adjuster.
Figure 7C:
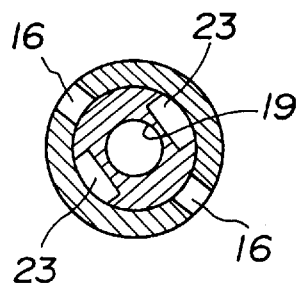
FIG. 7C is a cross-sectional view taken along the line N—N of FIG. 4 in the first position of the adjuster.
Figure 8A:
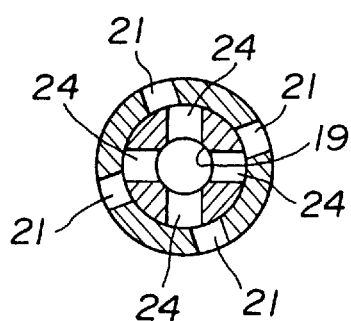
FIG. 8A is a cross-sectional view taken along the line K—K of FIG. 4 in the second position of the adjuster.
Figure 8B:
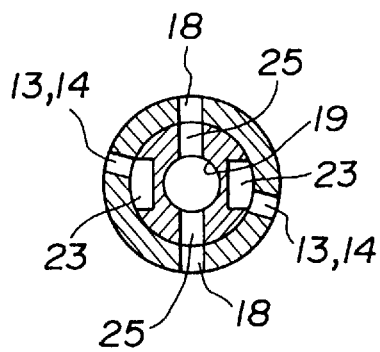
FIG. 8B is a cross-sectional view taken along the lines L—L and M—M of FIG. 4 in the second position of the adjuster.
Figure 8C:
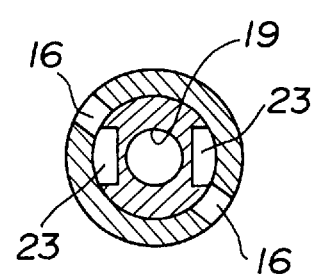
FIG. 8C is a cross-sectional view taken along the line N—N of FIG. 4 in the second position of the adjuster.
Figure 9A:
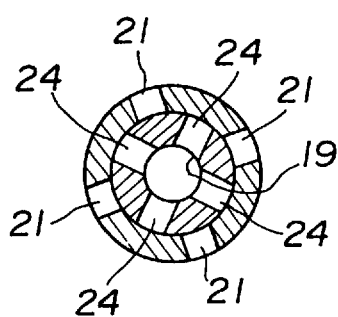
FIG. 9A is a cross-sectional view taken along the line K—K of FIG. 4 in the third position of the adjuster.
Figure 9B:
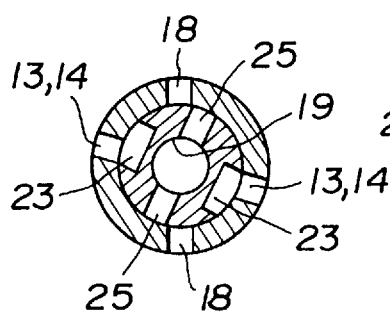
FIG. 9B is a cross-sectional view taken along the lines L—L and M—M of FIG. 4 in the third position of the adjuster.
Figure 9C:
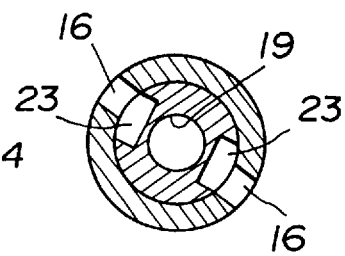
FIG. 9C is a cross-sectional view taken along the line N—N of FIG. 4 in the third position of the adjuster.
Figure 10:
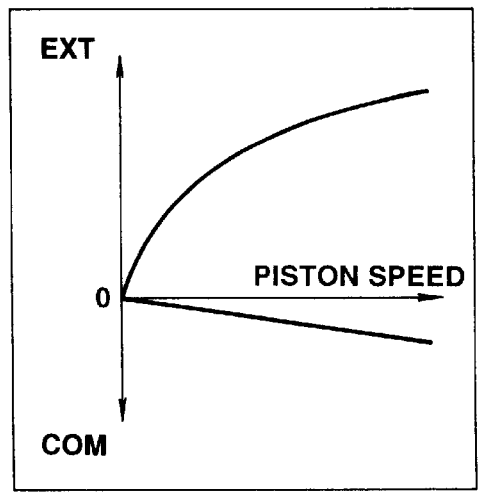
FIG. 10 is a diagram used in explaining the damping force characteristic in the first position of the adjuster.
Figure 11:
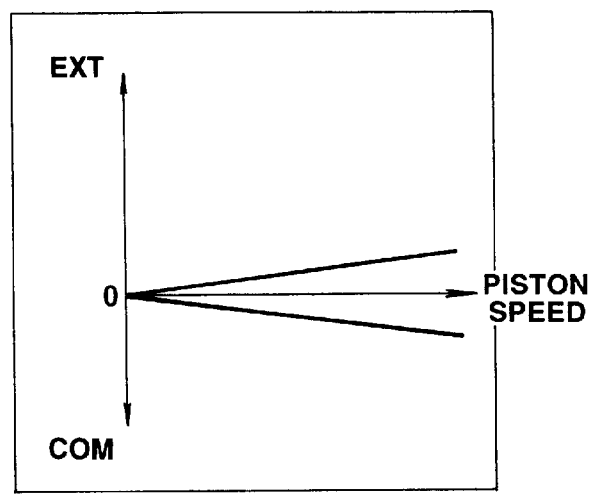
FIG. 11 is a diagram used in explaining the damping force characteristic in the second position of the adjuster.
Figure 12:
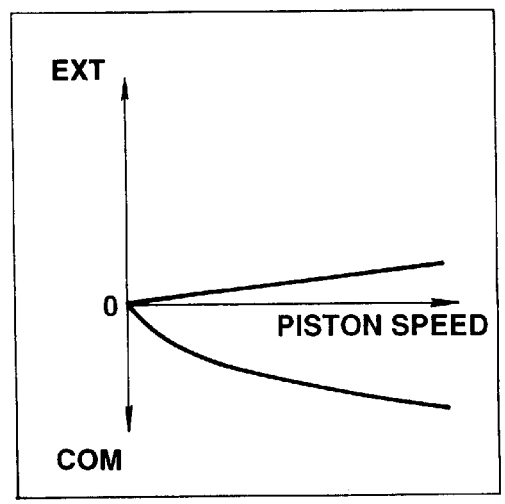
FIG. 12 is a diagram used in explaining the damping force characteristic in the third position of the adjuster.

The adjuster 40 can be rotated to adjust the damping force characteristics of the shock absorber SA in a plurality of steps on both of the extension and compression sides, as shown in FIG. 5. It is now assumed that the adjuster 40 is at a second position ② corresponding to a soft range SS. as shown in FIG. 6, where the shock absorber SA has a soft damping force characteristic on both of the extension and compression sides thereof. This damping force characteristic is shown in FIG. 11. In the second position ④, the components of the piston 31 are positioned as shown in FIGS. 8A, 8B and 8C. FIG. 8A is a cross-sectional view taken along the line K—K of FIG. 4, FIG. 8B is a cross-sectional view taken along the lines L—L and M—M of FIG. 4, and FIG. 8C is a cross sectional view taken along the line N—N of FIG. 4. When the adjuster 40 rotates in a counterclockwise direction from the second position ②, the damping force characteristic of the shock absorber SA changes toward its hard characteristic side in a plurality of steps only on the extension side thereof. Eventually, the adjuster 40 comes to a first position ① corresponding to an extension side hard range HS, as shown in FIG. 6, where the shock absorber SA has a fixed soft characteristic on the compression side thereof. This damping force characteristic is shown in FIG. 10. In the first position ①, the components of the piston 31 are positioned as shown in FIGS. 7A, 7B and 7C. FIG. 7A is a cross-sectional view taken along the line K—K of FIG. 4, FIG. 7B is a cross-sectional view taken along the lines L—L and M—M of FIG. 4, and FIG. 7C is a cross-sectional view taken along the line N—N of FIG. 4. When the adjuster 40 rotates in the clockwise direction from the second position ②, the damping force characteristic of the shock absorber SA changes toward its hard characteristic side in a plurality of steps only on the compression side thereof. Eventually, the adjuster 40 comes to a third position ③ corresponding to a compression side hard range SH, as shown in FIG. 6, where the shock absorber SA has a fixed soft characteristic on the extension side thereof. This damping force characteristic is shown in FIG. 12. In the third position ③, the components of the piston 31 are positioned as shown in FIGS. 9A, 9B and 9C. FIG. 9A is a cross-sectional view taken along the line K—K of FIG. 4, FIG. 9B is a cross-sectional view taken along the lines L—L and M—M of FIG. 4, and FIG. 9C is a cross-sectional view taken along the line N—N of FIG. 4.

Figure 13:
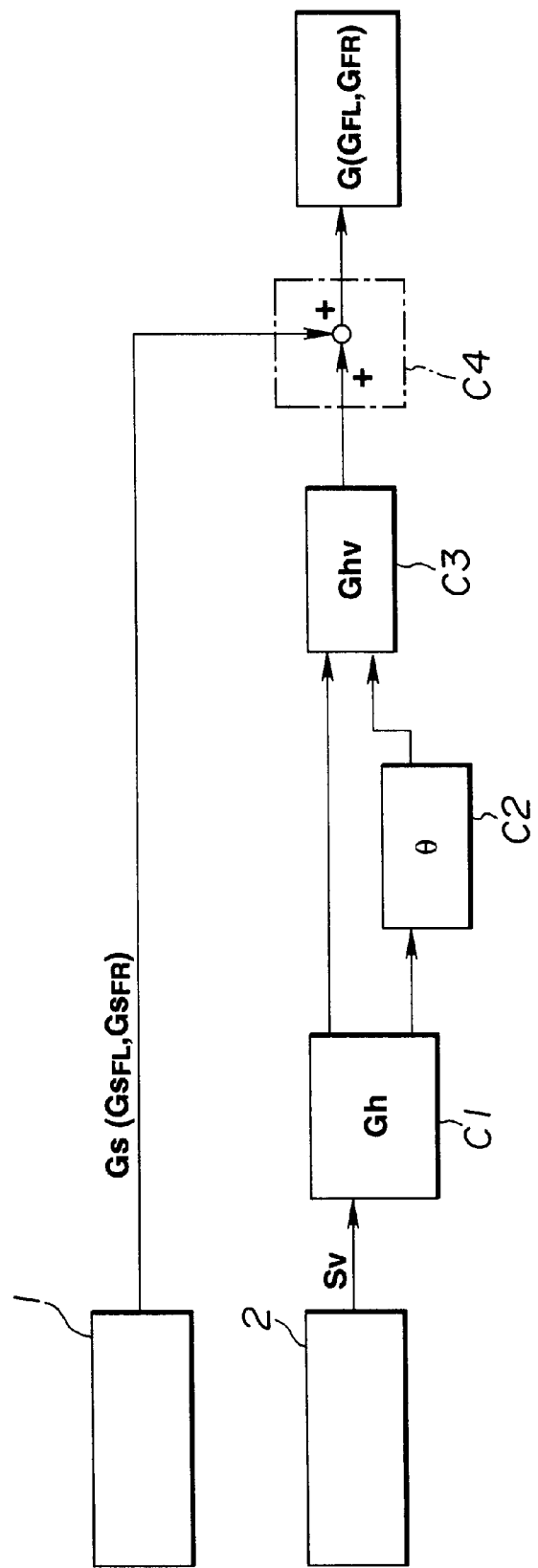
FIG. 13 is a block diagram showing a signal processing unit used in the suspension control system of FIG. 1.

Referring to FIG. 13, there is shown a signal processing circuit included in the interface unit 4a for calculating the sprung mass vertical accelerations G (GFL and GFR). This calculation is made by correcting the sprung mass vertical acceleration indicative signals fed from the vertical G sensors 1FL and 1FR based on the vehicle speed indicative signal fed from the vehicle speed sensor 2. The signal processing circuit includes four blocks (C1 to C4). The first block C1 receives the sensor signal indicative of the sensed vehicle speed Sv from the vehicle speed sensor 2 and it calculates a vehicle longitudinal acceleration Gh based on the rate (dSv/dt) of change of the vehicle speed indicative signal. The calculated longitudinal acceleration Gh has a positive sign when the vehicle is accelerated and a negative sign when the vehicle is decelerated. The second block C2 receives the calculated vehicle longitudinal acceleration Gh transferred thereto from the first block C1 and it calculates a vehicle pitching angle θ based on the vehicle longitudinal acceleration Gh from the following equation:

$$\theta = f_1(Gh) \qquad (1)$$

Figure 14:
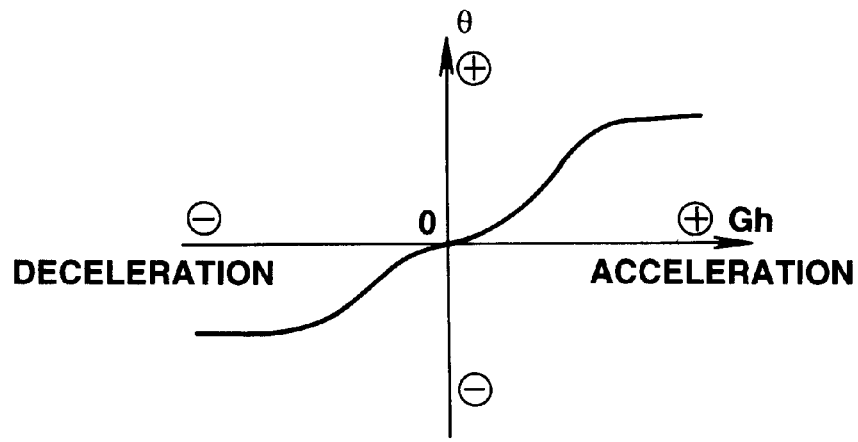
FIG. 14 is a graph of vehicle pitching angle versus vehicle longitudinal acceleration.

The vehicle pitching angle θ may be calculated based on data stored in a look-up table programmed into the computer. The look-up table defines the vehicle pitching angle θ as a function of vehicle longitudinal acceleration Gh, as shown in FIG. 14. The look-up data may be obtained experimentally or derived empirically. The third block C3 receives the vehicle longitudinal acceleration Gh transferred thereto from the first block C1 and also the vehicle pitching angle θ transferred thereto from the second block C2 and it calculates a correction factor Ghv based on the vehicle longitudinal acceleration Gh and the vehicle pitching angle θ. This calculation is made from the following equation:

$$Ghv = -|Gh \cdot \sin\theta| \qquad (2)$$

or $$Ghv = f_2(-|Gh|) \qquad (2\text{-}1)$$

Figure 15:
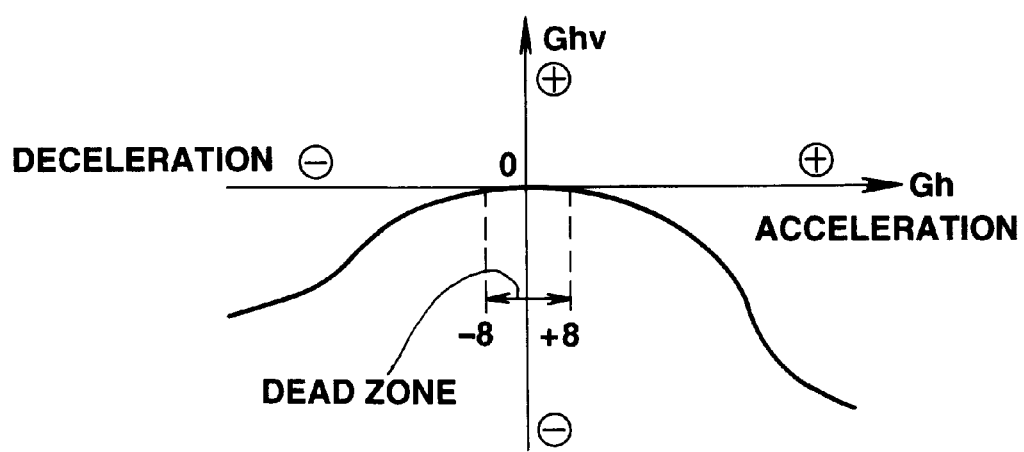
FIG. 15 is a graph of correction factor versus vehicle longitudinal acceleration.
Figure 16:
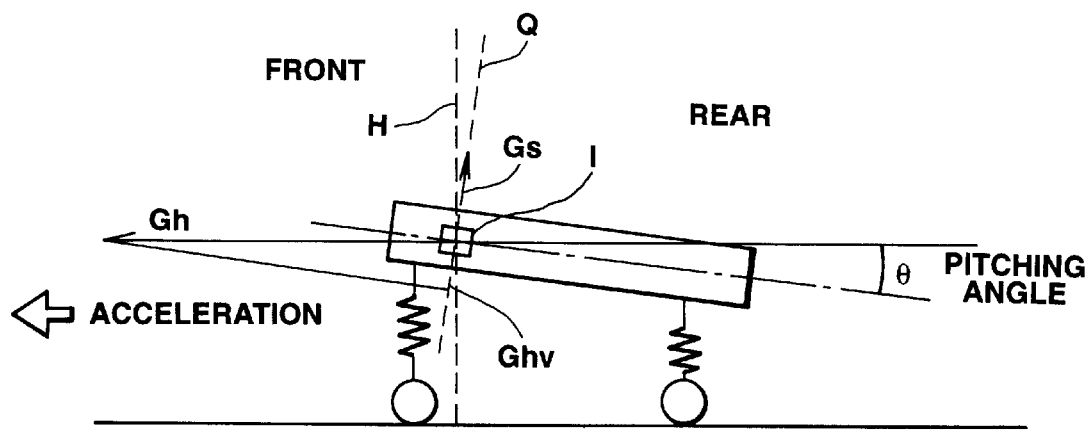
FIG. 16 is a schematic diagram used in explaining the vehicle position occupied during vehicle acceleration.
Figure 17:
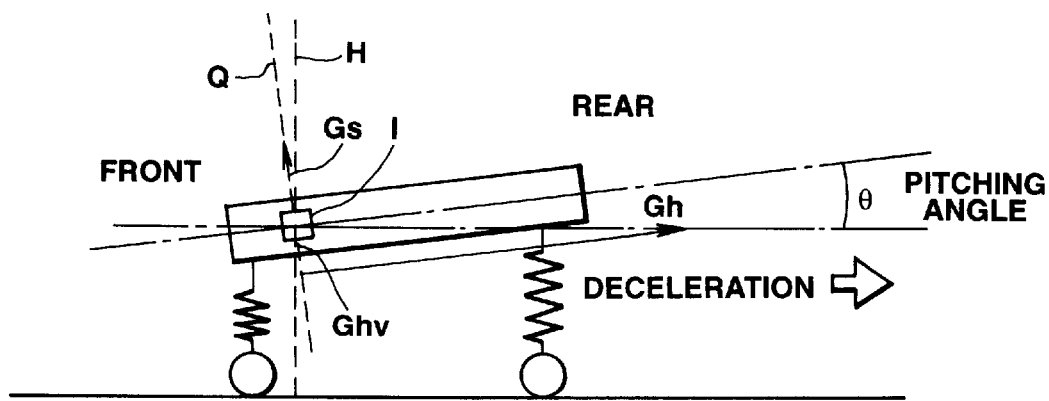
FIG. 17 is a schematic diagram used explaining the vehicle position occupied during vehicle deceleration.

The correction factor Ghv may be calculated based on data stored in a look-up table programmed into the computer. The look-up table defines the correction factor Ghv as a function of vehicle longitudinal acceleration Gh, as shown in FIG. 15. The look-up data may be obtained experimentally or derived empirically to provide a predetermined dead zone ±δ for correction control. The calculated correction factor Ghv corresponds to the component (Ghv) of the vehicle longitudinal acceleration Gh sensed by the vertical G sensors 1 when the vehicle inclined at a pitching angle θ because of vehicle acceleration (FIG. 16) or vehicle deceleration (FIG. 17). The fourth block C4 receives the correction factor Ghv fed thereto from the third block C3 and also the vertical accelerations Gs fed thereto from the vertical G sensors 1FL and 1FR and it calculates the sprung mass vertical accelerations G (GFL, GFR) by subtracting the correction factor Ghv from the vertical accelerations Gs (GSFL, GSFR) sensed by the respective vertical G sensors 1FL and 1FR. This correction is given as:

$$G = Gs - Ghv \qquad (3)$$

Figure 18:
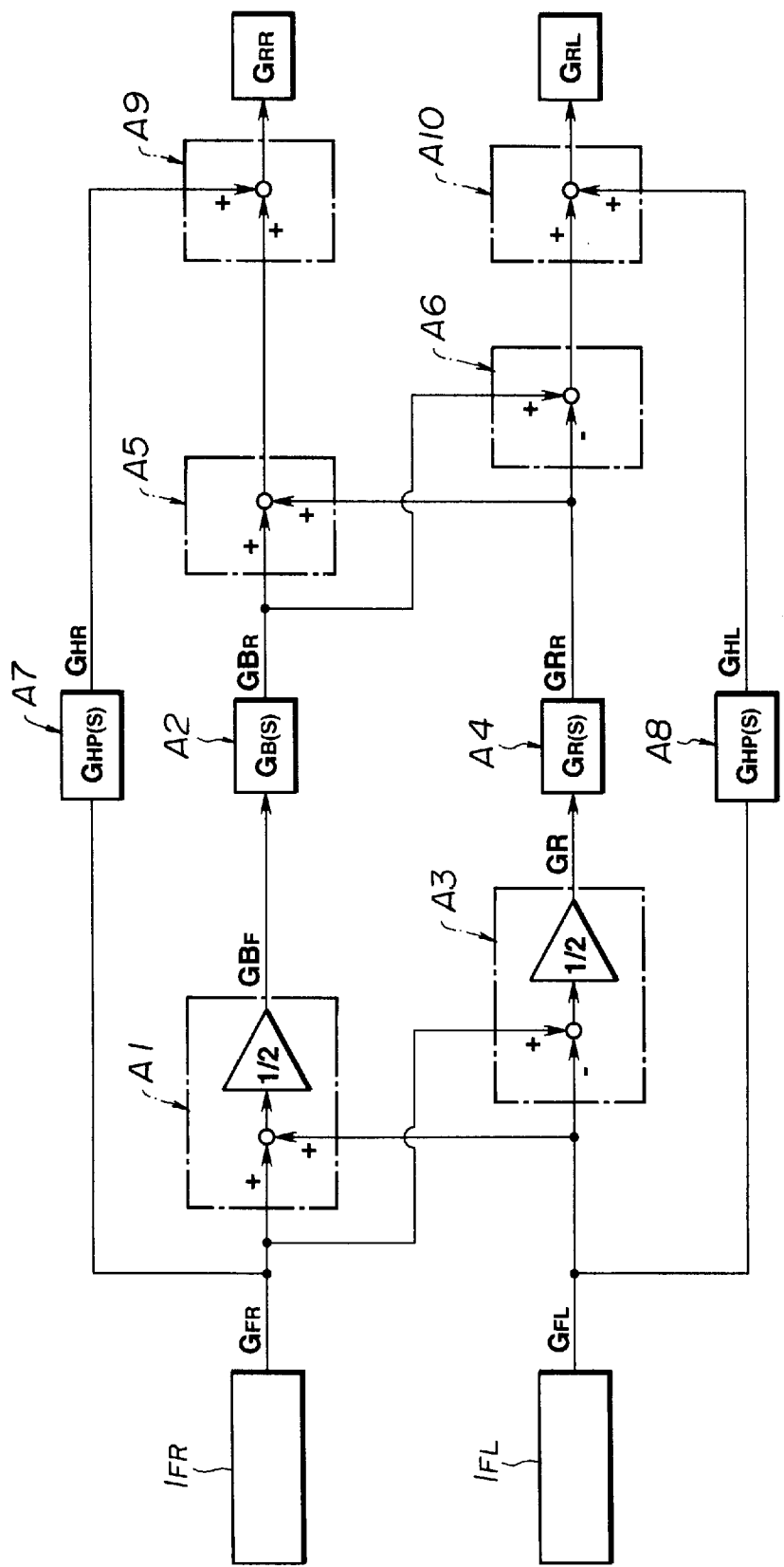
FIG. 18 is a block diagram showing another signal processing unit used in the suspension control system of FIG. 1.

Referring to FIG. 18, there is shown another signal processing circuit included in the interface unit 4a for calculating sprung mass vertical accelerations GRL and GRR at the rear-left and -right road wheel positions. This signal processing circuit includes ten blocks A1 to A10. The first block A1 receives the sensor signals indicative of the sprung mass vertical accelerations GFL and GFR sensed at the front-left and -right road wheel positions from the front-left and -right vertical G sensors 1FL and 1FR and it calculates a bounce rate GBF at the center of the front-left and -right road wheel positions from the following equation:

$$GB_F (G_{FL} + G_{FR})/2 \qquad (4)$$

The second block A2 receives the bounce rate GBF transferred thereto from the first block A1 and it employs a transfer function GB(s) for the road surface input from the front road wheel positions to the rear road wheel positions to calculate a bounce rate GBR at the center of the rear road wheels from the following equation:

$$G_B(s) = G1(s) \cdot G2(s) \cdot G3(s) \qquad (5)$$

where G1(s) is the transfer function from the front road wheel side sprung mass to the road surface, G2(s) is the transfer function from the rear road wheel side road surface to the rear road wheel side sprung mass, and G3(s) is the delay transfer function for the difference between the times at which inputs occur at the front and rear positions of the vehicle body. The delay transfer function G3(s) is given from the following equation:

$$G3(s) = W_B/S_V \qquad (6)$$

where WB is the wheelbase of the vehicle, and Sv is the vehicle speed.

The third block A3 receives the sensor signals indicative of the sprung mass vertical accelerations GFL and GFR sensed at the front-left and -right road wheel positions from the front-left and -right vertical G sensors 1FL and 1FR and it calculates a vehicle roll rate GR on the front road wheel side from the following equation:

$$GR = (G_{FR} - G_{FL})/2 \qquad (7)$$

The fourth block A4 receives the vehicle roll rate GR transferred thereto from the third block A3 and it employs a transfer function GR(s) from the front road wheel positions to the rear road wheel positions to calculate a vehicle roll rate $G_{RR}$ on the rear road wheel side.

The fifth block A5 receives the bounce rate $G_{BR}$ transferred thereto from the second block A2 and also the vehicle roll rate $G_{RR}$ transferred thereto from the fourth block A4 and it calculates a sprung mass vertical acceleration $G_{RR}$ at the rear-right road wheel position from the following equation:

$$G_{RR} = G_{BR} + G_{rR} \tag{8}$$

Similarly, the sixth block A6 receives the bounce rate $G_{BR}$ transferred thereto from the second block A2 and also the vehicle roll rate $G_{RR}$ transferred thereto from the fourth block A4 and it calculates a sprung mass vertical acceleration $G_{RL}$ at the rear-left road wheel position from the following equation:

$$G_{RL} = G_{BR} - G_{rR} \tag{9}$$

The seventh block A7 receives the sensor signal indicative of the sprung mass vertical acceleration $G_{FR}$ sensed at the front-right road wheel position from the front-left vertical G sensor $1_{FR}$ and it employs a transfer function $G_{HP}(s)$ for the vehicle body from the front road wheel position to the rear road wheel position to calculate the high frequency component $G_{HR}$ of the sprung mass vertical acceleration transmitted to the rear wheel side. The eighth block A8 receives the sensor signal indicative of the sprung mass vertical acceleration $G_{FL}$ sensed at the front-left road wheel position from the front-left vertical G sensor $1_{FL}$ and it employs the transfer function GH(s) to calculate the high frequency component $G_{HL}$ of the sprung mass vertical acceleration transmitted to the rear wheel side.

The ninth block A9 receives the signal ($G_{BR}+G_{RR}$) fed thereto from the fifth block A5 and also the sprung mass vertical acceleration high frequency component $G_{HR}$ fed thereto from the seventh block A7 and it calculates a sprung mass vertical acceleration $G_{RR}$ from the following equation:

$$G_{RR} = (G_{BR} + G_{RR}) + G_{HR} \tag{10}$$

The tenth block A10 receives the signal ($G_{BR}-G_{RR}$) fed thereto from the sixth block A6 and also the sprung mass vertical acceleration high frequency component $G_{HL}$ fed thereto from the eighth block A8 and it calculates a sprung mass vertical acceleration $G_{RL}$ from the following equation:

$$G_{RL} = (G_{BR} - G_{RR}) + G_{HL} \tag{11}$$

Figure 19:
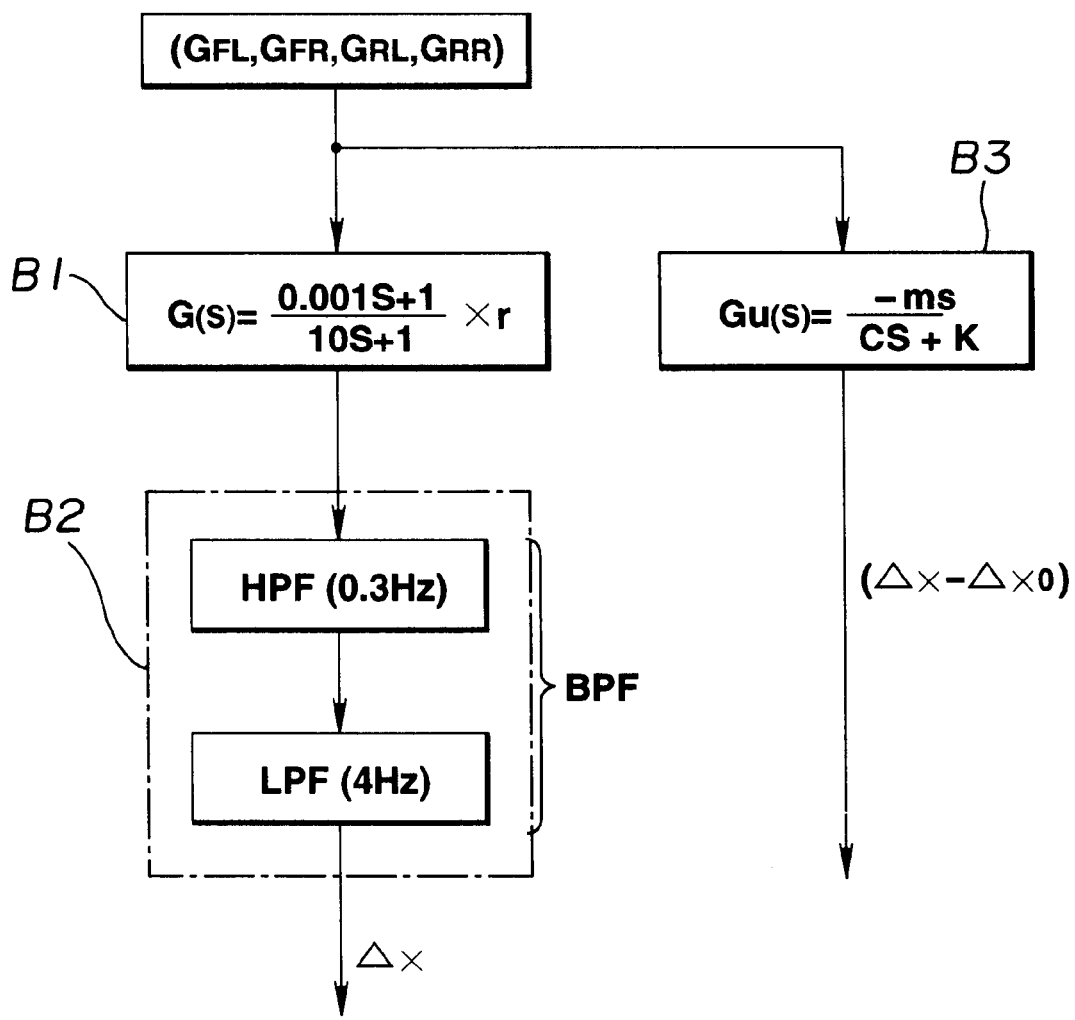
FIG. 19 is a block diagram showing still another signal processing unit used in the suspension control system of FIG. 1.

Referring to FIG. 19, there is shown still another signal processing circuit which includes blocks B1 to B3 for calculating the sprung mass vertical velocity ax at each of the road wheel positions and the relative velocity ($\Delta x - \Delta x_0$) between the sprung mass and the unsprung mass based on the corresponding one of the sprung mass vertical accelerations G ($G_{FL}$, $G_{FR}$, $G_{RL}$ and $G_{RR}$) obtained by the signal processing circuits of FIGS. 13 and 18. The block B1 employs a phase delay compensation equation to convert the sprung mass vertical accelerations G ($G_{FL}$, $G_{FR}$, $G_{RL}$ and $G_{RR}$) into sprung mass vertical velocities at the respective road wheel positions. The phase delay compensation equation is given as:

$$G(s) = (AS+1)\backslash(BS+1) \tag{12} \ (A<B)$$

Figure 20A:
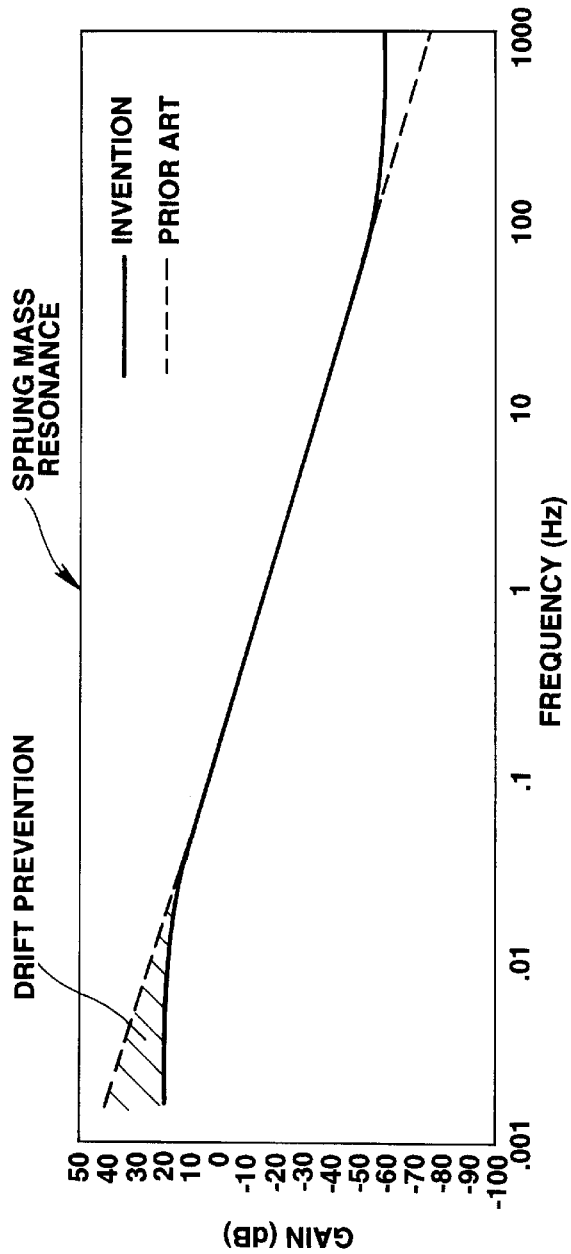
FIG. 20A is a graph of gain versus frequency.
Figure 20B:
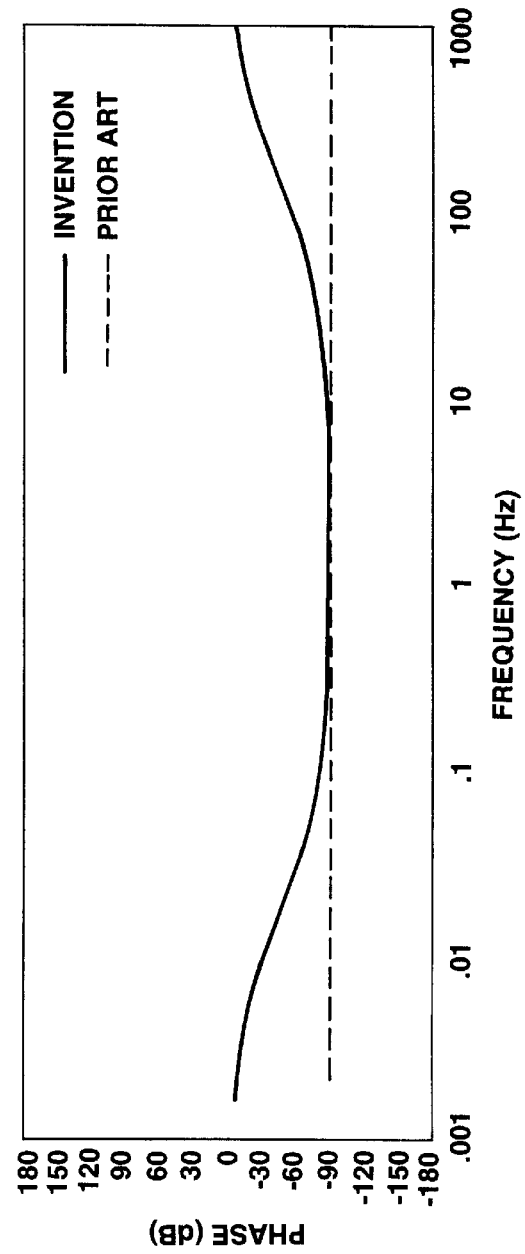
FIG. 20B is a graph of phase versus frequency.

A transfer function is used to provide phase and gain characteristics equivalent to the integration (1/S) in the frequency band (0.5 Hz to 3 Hz) required for the damping force characteristic control so as to decrease the gain on the low frequency side (−0.05 Hz). This transfer function is given as the following phase delay compensation equation:

$$G(s) = (0.001S+1)/(10S+1) \times \gamma \tag{13}$$

where $\gamma$ is the gain required to match the sprung mass vertical velocity signal obtained through the integration (1/S) with the gain characteristic. In this case, $\gamma=10$. It is, therefore, possible to reduce the gain on the low frequency side without regarding the phase characteristic in the frequency band (0.5 Hz to 3 Hz) required for the damping force characteristic control, as indicated by the solid curves of FIGS. 20A and 20B. The broken curves of FIGS. 20A and 20B indicate the gain and phase characteristics of the sprung mass vertical velocity signal obtained through the integration. (1/S).

The block B2 has a band pass filter function of filtering out the components except for the target frequency band. The band pass filter BPF includes a second-order high pass filter HPF (0.3 Hz) and a second-order low pass filter LPF (4 Hz) to obtain sprung mass vertical velocities $\Delta x$ ($\Delta x_{FL}$, $\Delta x_{FR}$, $\Delta x_{RL}$, $\Delta x_{RR}$) at the taget control frequency band corresponding t the sprung mass resonance frequency band. The block B3 employs a transfer function Gu(s) to derive the relative velocities ($\Delta x - \Delta x_0$) [($\Delta x - \Delta x_0$)FL, ($\Delta x - \Delta x_0$)FR, ($\Delta x - \Delta x_0$)RL, ($\Delta x - \Delta x_0$)RR] based on the vertical accelerations G ($G_{FL}$, $G_{FR}$, $G_{RL}$, $G_{RR}$) detected by the vertical G sensors 1. The transfer function Gu(s) is given as:

$$G(s) = -ms/(cs+k) \tag{14}$$

where m is the sprung mass, c is the attenuation coefficient of the suspension and k is the spring constant of the suspension.

Figure 21:
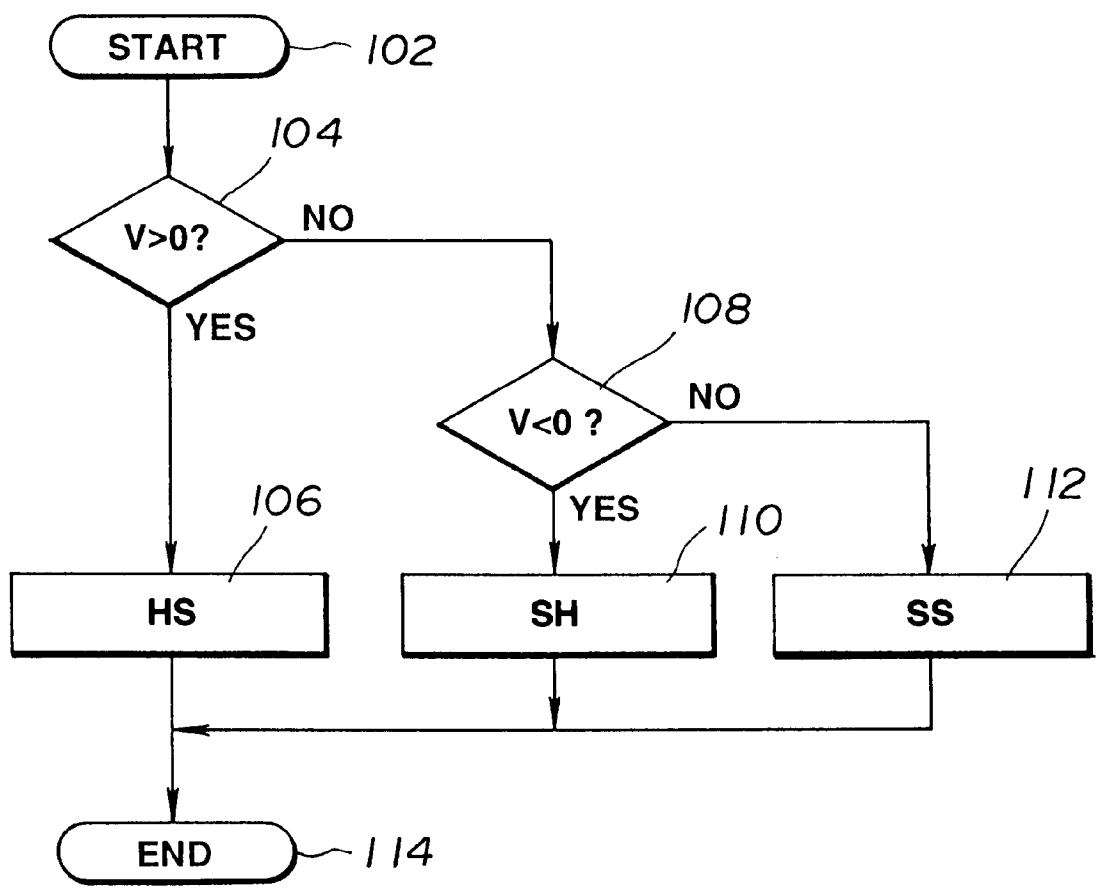
FIG. 21 is a flow diagram of the programming of the digital computer as it is used to control the damping force characteristic of each of the shock absorbers.

FIG. 21 is a flow diagram illustrating the programming of the digital computer as it is used to control the damping force characteristic of each of the shock absorbers SA. The computer program is entered at the point 202. At the point 204 in the program, a determination is made as to whether or not the sprung mass vertical velocity $\Delta x$ for the corresponding one of the shock absorbers SA is positive. If the answer to this question is "yes", then the program proceeds to the point 206 where a command is produced to operate the shock absorber in the extension phase hard range HS and then to the end point 214. Otherwise, the program proceeds to another determination step at the point 208. this determination is as to whether or not the sprung mass vertical velocity $\Delta x$ is negative. If the answer to this question is "yes", then the program proceeds to the point 210 where a command is produced to operate the shock absorber in the compression phase hard range SH and then to the end point 214. Otherwise, it means that the sprung mass vertical velocity $\Delta x$ is zero and the program proceeds to the point 212 where a command is produced to operate the shock absorber in the soft range SS. Following this, the program proceeds to the end point 214.

Referring to FIGS. 22A to 22E, the shock absorber damping force characteristic control will be described further. It is now assumed that the sprung mass vertical velocity Δx changes with time as shown in FIG. 22A. When the sprung mass vertical velocity Δx is at zero, the shock absorber is controlled to have a damping force characteristic placed in the soft range SS where both of the extension and compression phases exhibit predetermined fixed low damping force characteristics. When the sprung mass vertical velocity Δx has a positive value, the damping force characteristic of the shock absorber is controlled in the extension phase hard range HS where the compression phase is fixed at a predetermined low (soft) damping force characteristic. The extension phase damping force characteristic (target damping force characteristic position PT) is changed in direct proportion to the sprung mass vertical velocity Δx. In this case, the target damping force characteristic position PT is calculated as:

$$P_T = \alpha \cdot \Delta x \cdot K_u \qquad (15)$$

where α is the constant in the extension phase and Ku is a gain set according to the relative velocity $(\Delta x - \Delta x_0)$. When the sprung mass vertical velocity Δx has a negative value, the damping force characteristic of the shock absorber is controlled in the compression phase hard range SH to provide a predetermined low (soft) damping force characteristic in the extension phase and the compression phase damping force characteristic (target damping force characteristic position PC) is varied in direct proportion to the spring mass vertical velocity Δx as:

$$P_C = \beta \cdot \Delta x \cdot K_u \qquad (16)$$

where β is the constant in the compression phase.

In FIG. 22C, the character a designates a control range where the sprung mass vertical velocity Δx changes from its negative sign (downward) to its positive sign (upward). Since the relative velocity $(\Delta x - \Delta x_0)$ remains negative (the shock absorber operates in the compression phase), the shock absorber is controlled in the extension phase hard range HS according to the sign (direction) of the sprung mass vertical velocity Δx. In the control range a, thus, the shock absorber is controlled to provide a soft characteristic in the compression phase.

In the control range b where sign of the sprung mass vertical velocity Δx remains positive (upward) and the relative velocity $(\Delta x - \Delta x_0)$ changes from its negative sign to its positive sign indicating the extension phase (EXT) of the shock absorber, the shock absorber is controlled in the extension phase hard range HS according ot the sign (direction) of the sprung mass vertical velocity Δx and the shock absorber is in the extension phase. In this control range, thus, the shock absorber is controlled to have a hard characteristic in direct proportion to the sprung mass vertical velocity Δx in the extension phase corresponding t the present phase of the shock absorber.

In the control range c where the sprung mass vertical velocity Δx changes from its positive sign (upward) to its negative sign (downward) with the relative velocity $(\Delta x - \Delta x_0)$ having a positive sign indicating the extension phase (EXT) of the shock absorber, the shock absorber is controlled in the compression phase hard range SH according to the sign of the sprung mass vertical velocity Δx. In this control range, thus, the shock absorber is controlled to have a soft characteristic in the extension phase corresponding to the present phase of the shock absorber.

In the control range d where the sign of the sprung mass vertical velocity Δx remains negative (downward) and the relative velocity $(\Delta x - \Delta x_0)$ changes from its positive sign to its negative sign indicating the extension phase (EXT) of the shock absorber, the shock absorber is controlled in the compression phase hard range SH based on the sign of the sprung mass vertical velocity Δx. In this control range, thus, the shock absorber is controlled to have a hard characteristic in the compression phase corresponding to the present phase of the shock absorber.

In this embodiment, the shock absorber is controlled to provide a hard characteristic in the present phase of the shock absorber when the signs of the sprung mass vertical velocity Δx and the relative velocity $(\Delta x - \Delta x_0)$ are the same (control ranges b and d) and to provide a soft characteristic in the present phase of the shock absorber when the signs of the sprung mass vertical velocity Δx and the relative velocity $(\Delta x - \Delta x_0)$ are different (control ranges a and c). It is, therefore, possible to perform the same control as the damping force characteristic control made according to the sky hook theory based on the sprung mass vertical velocity Δx only. Furthermore, the damping force characteristic position has been switched to the hard characteristic side in the previous control ranges a and c at the time when the phase of the shock absorber is switched, that is, in response to a change from the control range a to the control range b and also to a change from the control range c to the control range d (from the soft characteristic to the hard characteristic). It is, therefore, possible to make a change from the soft characteristic to the hard characteristic with no delay in time. This is effective to provide a very fast control response. Since a change from the hard characteristic to the soft characteristic is made without driving the pulse motor 3, it is possible to increase the pulse motor durability and save the power consumption.

The correction of the sprung mass vertical acceleration indicative signals Gs used in the shock absorber damping force characteristic control will be described further with reference to FIGS. 16 and 17.

When the vehicle is running at a constant speed, the longitudinal acceleration Gh is zero, and thus the correction factor Ghv is zero. In this case, the sprung mass vertical accelerations Gs (GsFL, GsFR) sensed by the vertical G sensors 1 are used, with no correction, for the shock absorber damping force characteristic control.

When the vehicle is accelerated, the vehicle body rises on its front side and falls on its rear side, the direction Q of detection of the vertical G sensors 1 (1FL, 1FR) is inclined with respect to the line H perpendicular to the road surface. With a longitudinal acceleration +Gh acting in the direction parallel with the road surface on the vehicle body held in this inclined (scutting) position, the component (Ghv) of the longitudinal acceleration +Gh acts in the direction Q of detection of the vertical G sensors 1 (1FL, 1FR) to drift the vertical acceleration signals in the negative direction to a degree corresponding to the component Ghv. According to the invention, the vertical acceleration signals produced from the vertical G sensors 1 (1FL, 1FR) are corrected by subtracting the correction factor Ghv from the vertical accelerations Gs as described in connection with Equations (1), (2) and (3). This is effective to prevent the sprung mass vertical acceleration indicative signals from drifting during vehicle acceleration. It is, therefore, possible to perform the shock absorber damping force characteristic control under substantially the same condition when the vehicle is accelerated as when the vehicle is running at a constant speed.

When the vehicle is decelerated, the vehicle body falls on its front side and rises on its rear side, the direction Q of detection of the vertical G sensors 1 (1FL, 1FR) is inclined with respect to the line H perpendicular to the road surface. With a longitudinal acceleration −Gh acting in the direction parallel with the road surface on the vehicle body held in this inclined (diving) position, the component (Ghv) of the longitudinal acceleration −Gh acts in the direction Q of detection of the vertical G sensors 1 (1FL, 1FR) to drift the vertical acceleration signals in the negative direction to a degree corresponding to the component Ghv. According to the invention, the vertical acceleration signals produced from the vertical G sensors 1 (1FL, 1FR) are corrected by subtracting the correction factor Ghv from the vertical accelerations Gs as described in connection with Equations (1), (2) and (3). This is effective to prevent the sprung mass vertical acceleration indicative signals from drifting during vehicle acceleration. It is, therefore, possible to perform the shock absorber damping force characteristic control under substantially the same condition when the vehicle is decelerated as when the vehicle is running at a constant speed.

The vertical G sensors 1 would detect negative (downward) sprung mass vertical acceleration components when the vehicle is decelerated in its diving position in the presence of vehicle braking. The low-frequency downward sprung mass vertical acceleration components would cause these sensor signals to drift. The signals may drift during rapid vehicle acceleration, during vehicle acceleration on a long upward slope (in this case upward sprung mass vertical acceleration components are detected), during vehicle acceleration on a long downward slope o in the presence of low-frequency DC components introduced onto the sensor signals from the vertical G sensors 1. According to the invention, a phase delay compensation equation is utilized to convert the sprung mass vertical accelerations G into corresponding sprung mass vertical velocities. This is effective to reduce the gain in he low-frequency band without degrading the phase characteristic in the frequency band (0.5 Hz to 3 Hz) required for the damping force characteristic control. It is, therefore, possible to keep the damping force characteristic control free from the influence of the low-frequency side gain reduction even when the sensor signals produced from the vertical G sensors 1 have low frequency components introduced thereon.

The suspension control system of the invention provides the following advantages:

When the vehicle is accelerated or decelerated, the sprung mass vertical acceleration indication signals drift, because of the vehicle body inclination and the longitudinal acceleration or deceleration, to degrade the shock absorber damping force characteristic control performance. The invention can eliminate such a difficulty and ensure good driving feel and stability. The invention requires only two vertical G sensors 1 to obtain information required for the sock absorber damping force characteristic control. Thus, the suspension control system is simple and inexpensive. Furthermore, since a phase delay compensation equation is utilized to convert the sprung mass vertical accelerations G into corresponding sprung mass vertical velocities Δx, it is possible to prevent the sensor signal drifts which may caused by low-frequency components superimposed thereon. This is effective to ensure good damping force characteristic control performance and good vehicle driving stability.

While the vehicle longitudinal acceleration is calculated based on the vehicle speed sensed by the vehicle speed sensor 2, it is to be understood that the vehicle longitudinal acceleration may be calculated based on the speed of rotation of one of the road wheels sensed by a road wheel speed sensor associated with the corresponding road wheel or the sprung mass longitudinal acceleration sensed by a vehicle longitudinal acceleration sensor. It is preferable to avoid control hunting by providing a dead zone around zero for the sprung mass vertical velocity. In this case, the damping force characteristic is held in the soft range SS when the sprung mass vertical velocity is in the dead zone. While the invention has been described in connection with a specified embodiment thereof, it is evident that many alternatives, modifications and variations will be apparent to those skilled in the art. For example, additional vertical G sensor may be provided to sense the sprung mass vertical accelerations at the respective rear road wheel positions. Accordingly, it is intended to embrace all alternatives, modifications and variations that fall within the scope of the appended claims.

What is claimed is:

1. A suspension control system for use with an automotive vehicle supported on front-left and -right road wheels at front-left and -right road wheel positions and also on rear-left and -right road wheels at rear-left and -right road wheel positions, comprising:

shock absorbers provided between sprung and unsprung masses of the vehicle at the respective road wheel positions for providing variable damping force characteristics;

sensors mounted on the vehicle for sensing sprung mass vertical accelerations acting in a predetermined direction with respect to the vehicle at the respective road wheel positions; and a control unit for determining a vehicle longitudinal acceleration, the control unit calculating a vehicle pitching angle based on the determined vehicle longitudinal acceleration, the control unit calculating a component of the vehicle longitudinal acceleration acting in the predetermined direction based on the calculated vehicle pitching angle and the determined vehicle longitudinal acceleration, the control unit correcting the sensed sprung mass vertical accelerations to cancel the calculated vehicle longitudinal acceleration component, and the control unit controlling the shock absorbers based on the respective corrected sprung mass vertical accelerations.

2. The suspension control system as claimed in claim 1, wherein the control unit includes a vehicle longitudinal acceleration sensor for sensing the longitudinal acceleration of the sprung mass.

3. The suspension control system as claimed in claim 1, wherein the control unit includes a vehicle speed sensor for sensing a speed of running of the vehicle, the control unit determining the vehicle longitudinal acceleration based on the sensed vehicle running speed.

4. The suspension control system as claimed in claim 1, wherein the control unit includes a road wheel speed sensor for sensing a speed of rotation of one of the road wheels, the control unit determining the vehicle longitudinal acceleration based on the sensed road wheel speed.

5. A suspension control system for use with an automotive vehicle supported on front-left and -right road wheels at front-left and -right road wheel positions and also on rear-left and -right road wheels at rear-left and -right road wheel positions, comprising:

first and second sensors configured to respectively sense a sprung mass vertical acceleration at front-left and front-right positions of the automotive vehicle, and to respectively output first and second sensed signals as a result;

a first unit configured to receive the first and second sensed signals from the first and second sensors, respectively, to calculate a bounce rate at a center position between the front-left and -right road wheel positions, and to output a first output signal in accordance with the calculated bounce rate;

a second unit configured to receive the first output signal from the first unit, to calculate a filtered bounce rate at the center position based on the first output signal, a first transfer function that is based on a first road surface input from the front-left and -right road wheel positions, a second transfer function that is based on a second road surface input from the rear-left and -right road wheel positions, and a third transfer function that is based on difference between input times of the first and second road surface inputs, and to output a second output signal as a result;

a third unit configured to receive the first and second sensed signals from the first and second sensors, respectively, and to calculate a vehicle roll rate at a front wheel side, and to output a third output signal in accordance with the calculated bounce rate;

a fourth unit configured to receive the third output signal from the third unit and to apply a fourth transfer function to the third output signal so as to calculate and output a fourth output signal;

a fifth unit configured to receive the second output signal and the fourth output signal, and to calculate and output, as a fifth output signal, a sprung mass vertical acceleration at the rear-right road wheel position;

a sixth unit configured to receive the second output signal and the fourth output signal, and to calculate and output, as a sixth output signal, a sprung mass vertical acceleration at the rear-left road wheel position;

a seventh unit configured to receive the first sensed signal and to apply a fifth transfer function to the first sensed signal so as to calculate and output, as a seventh output signal, a high frequency component of the first sense d signal that is transmitted to the rear-left and -right road wheel positions;

an eighth unit configured to receive the second sensed signal and to apply a sixth transfer function to the first sensed signal so as to calculate and output, as an eighth output signal, a high frequency component of the second sensed signal that is transmitted to the rear-left and -right road wheel positions;

a ninth unit configured to receive the fifth output signal and the seventh output signal, and to calculate a rear-right sprung mass vertical acceleration as a result; and a tenth unit configured to receive the sixth output signal and the eighth output signal, and to calculate a rear-left sprung mass vertical acceleration as a result.

* * * * *